United States Patent [19]

Snyder

[11] 4,212,235
[45] Jul. 15, 1980

[54] BARBECUE FOOD HOLDER

[76] Inventor: Vernon W. Snyder, Box 32, Sabetha, Kans. 66534

[21] Appl. No.: 10,687

[22] Filed: Feb. 9, 1979

[51] Int. Cl.² ............................................. A47J 37/00
[52] U.S. Cl. ..................................... 99/441; 99/394; 99/402
[58] Field of Search ................. 99/394, 441, 402, 384; 294/8, 99 R

[56] References Cited

U.S. PATENT DOCUMENTS

| 498,984 | 6/1893 | Monachesi | 99/394 |
| 1,945,165 | 1/1934 | Smith | 99/402 X |
| 2,280,131 | 4/1942 | Rossini | 99/402 |

Primary Examiner—Billy J. Wilhite
Attorney, Agent, or Firm—John A. Hamilton

[57] ABSTRACT

A holder for food as it is barbecued over an open charcoal bed, the holder consisting of a clamp comprising a pair of open grids linked pivotally together at their forward edges and having elongated handles projecting from their rearward edges whereby they may be opened for the insertion of food therebetween, and closed to clamp the food therebetween, and a sliding connector joining the handles and movable to close the grids forcibly together to clamp the food securely, and to secure them in the closed position.

4 Claims, 7 Drawing Figures

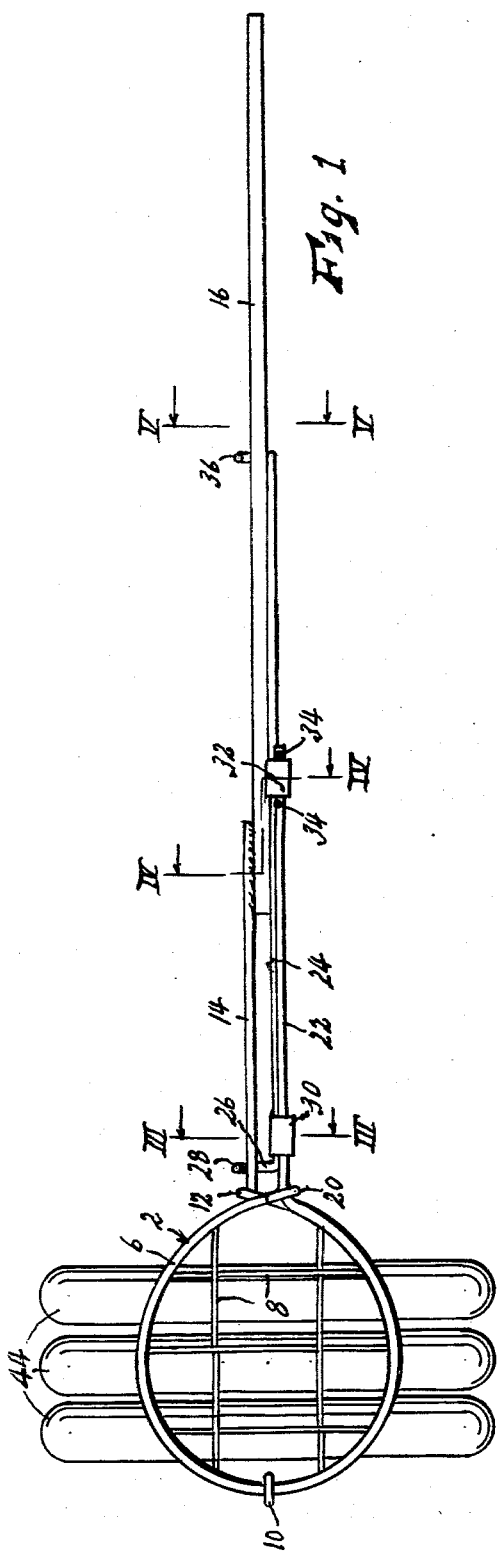

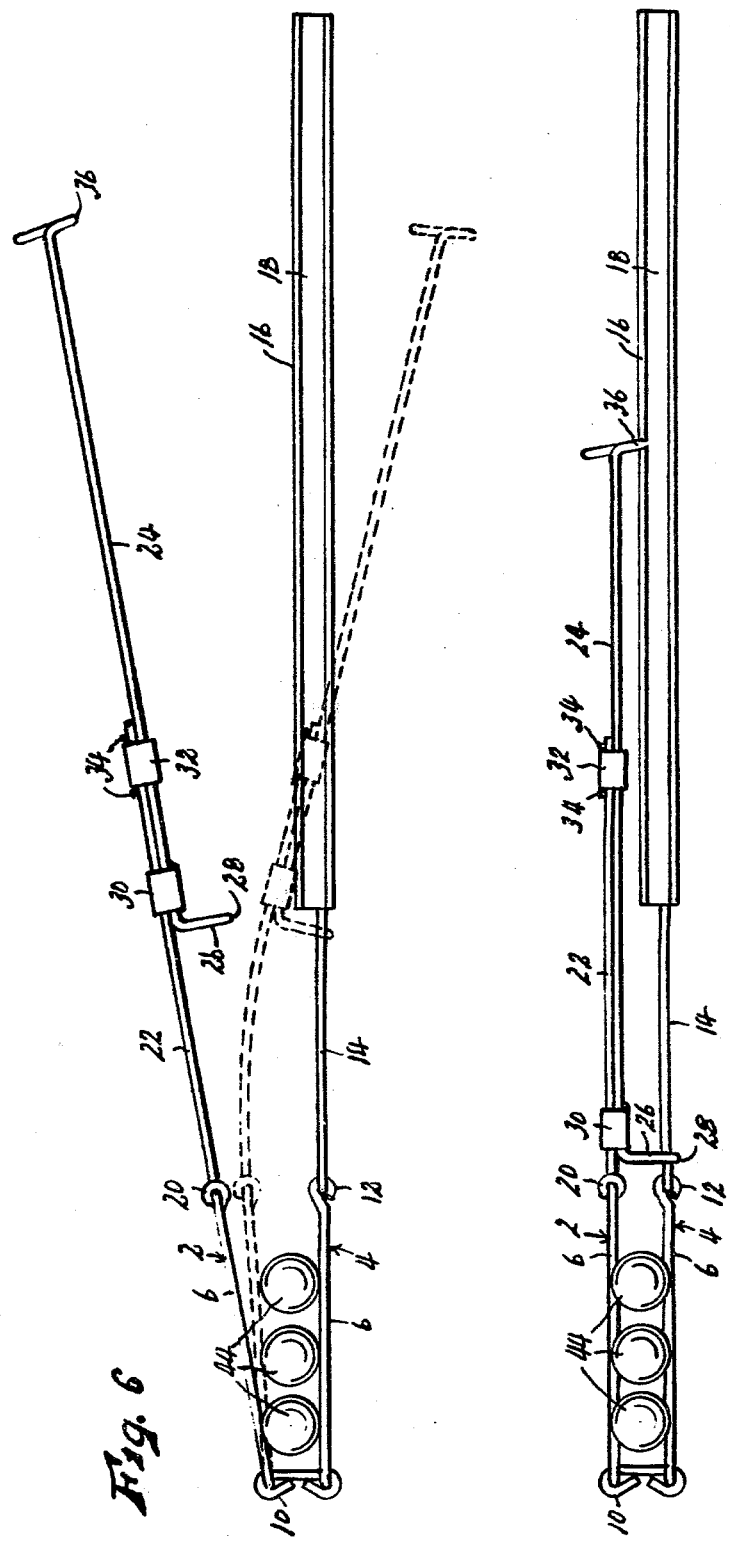

BARBECUE FOOD HOLDER

This invention relates to new and useful improvements in food holders, and has particular reference to a device operable to hold food products, particularly meat products such as frankfurters, hot dogs, hamburgers, and the like, as they are held manually over an open bed of charcoal. Such a manually held holder must of course be freely manipulable in order to expose all of the surfaces of the food uniformly to the cooking heat, but in the past difficulty has been experienced in mounting the food in the holder with sufficient security that none of it can fall from the holder as the latter is turned or otherwise moved during the cooking process. This difficulty is encountered especially when the food is in separate pieces, such for example as several hot dogs, or is only loosely cohered, such as hamburgers or other ground meat. Holders have previously been used which include a pair of grids between which the food is mounted, and secured by moving the grids toward each other to grip or clamp the food therebetween, and this would be satisfactory if some means were provided to insure that the grids were substantially in parallel planes when closed, since they would then engage all of the separate hot dogs, or other food pieces, with uniform force, or engage generally the entire area of a hamburger meat patty to hold it securely. So far as is within my knowledge, no previous holder of the class described has been provided with any satisfactory means guaranteeing this parallelism for the grids. The provision of such a means is the primary object of the present invention.

Another object is the provision of a barbecue holder of the character described including means whereby the final closing movement of the grids is accomplished by a sliding wedge action supplying a considerable mechanical advantage. The final closing movement of the grids usually involves indentation or compression of the food therebetween, which may require substantial mechanical force, and the sliding wedge action eases and facilitates the application of this force.

Other objects are extreme simplicity and economy of construction, and simplicity, ease and convenience of operation.

With these objects in view, as well as other objects which will appear in the course of the specification, reference will be had to the accompanying drawing, wherein:

FIG. 1 is a top plan view of a barbecue food holder embodying the present invention, showing three hot dogs mounted operatively therein, FIG. 2 is a side elevational view of the holder as shown in FIG. 1, FIG. 3 is an enlarged sectional view taken on line III—III of FIG. 1;

FIG. 4 is an enlarged sectional view taken on line IV—IV of FIG. 1,

FIG. 5 is an enlarged, fragmentary sectional view taken on line V—V of FIG. 1,

FIG. 6 is a view similar to FIG. 2, illustrating the initial steps of mounting the hot dogs therein, and FIG. 7 is a view similar to FIG. 6 illustrating subsequent steps in the mounting of the hot dogs.

Like reference numerals apply to similar parts throughout the several views. The barbecue holder forming the subject matter of the present invention includes an upper grid 2 and a lower grid 4, disposed one above the other in superposed position and of the same size. Each grid is generally circular, being formed of a loop of heavy but resilient border wire 6 over which is affixed an open screen 8 of steel wire or the like. The border wires of the two grids are pivotally connected together at their forward edges, in spaced apart relation, by a wire link 10. The loop formed by the border wire 6 of the lower grid is closed by twisting the end portion of the wire about a standing portion of the wire, as at 12, and the standing portion of the wire is extended rearwardly from the grid, diametrically to the grid and in the plane thereof, to form an arm 14. The rearward end of said arm is welded or otherwise affixed to the forward end of a substantially rigid, elongated handle bar 16, which forms an extension of said arm, and which in conjunction with said arm forms a handle by which the holder may be manually supported and manipulated. Bar 16 has a longitudinally extending groove 18 along the full length of each side thereof.

Similarly, the loop formed by the border wire 6 of the upper grid is closed by twisting the end portion of the wire about a standing portion of the wire, as at 20, and the standing portion of the wire is extended outwardly from the grid to form a resilient arm 22 generally normally parallel to arm 14 of the lower grid, and extending to a sufficient distance to be capable of overlapping the forward portion of handle bar 16. Extending along arm 22, parallel thereto and in sliding contact therewith, is a latch wire 24, also resilient, and of greater length than said arm. Wire 24, in conjunction with handle wire 22, forms a handle for upper grid 2.

At its forward end, latch wire 24 is bent at right angles to form an arm 26, the outer end of which is formed to present a hook formation 28 capable of engaging slidably about arm 14 of the lower grid. Closely adjacent hook arm 26, latch wire 24 is connected to arm 22 by a sheet metal clip 30 which permits relative longitudinal sliding movement of members 22 and 24. Said clip may be affixed to latch wire 24 by welding, as indicated, but is freely slidable along arm 22. Members 22 and 24 are also connected, at the rearward end of arm 22, by a second sheet metal clip 32 which also permits relative longitudinal sliding movement of said members, clip 32 being freely rotatable on both members, but being restrained against sliding movement along arm 22 by stops 34 affixed to said arm at the respective ends of said clip. Latch wire 24 extends well to the rear of the rearward end of arm 22, though not to the forward end of handle bar 16, and is formed at its rearward end to present an upwardly opening, U-shaped hook 36 lying in a vertical plane transverse to bar 16. Hook 36 has a pair of opposite legs 38 and 40 (see FIG. 5) adapted to lie against opposite sides of bar 16 when the hook is pressed upwardly into engagement therewith, and at least one of said legs (leg 40 as shown) is offset to form a rounded detent 42 adapted to snap into engagement with a groove 18 of said bar when the hook is so engaged, thereby providing a snugly secure but releasable connection.

In use, food is inserted in the holder by first releasing both the forward and rearward hooks 28 and 36 of the latch bar and pivoting grids 2 and 4 relatively further apart on link 10. Food (three hot dogs 44 as shown) may then be laid on lower grid 4, and the grids pivoted toward each other on link 10. Since the spacing between the grids, when moved to parallel relation, should be somewhat less than the original thickness of the food in order to insure indentation or compression of the food so that it will be securely retained, the grids will not normally close to a parallel relation at this time, but will be constrained by the food therebetween to remain in a somewhat open position, as shown in solid lines in FIG. 6. Using rear latch hook 36 as a handle, latch wire 24 is moved slidably to the rear relative to arm 22, as permitted by clips 30 and 32, until forward latch hook 28 is aligned with the rearward portion of arm 14 of the lower grid, also as shown in solid lines in FIG. 6. Then, still using hook 36 as a handle, arm 22 and wire 24 are flexed downwardly alongside of handle bar 16, until front latch hook 28 is at the level of arm 14, and wire 24 is turned axially, as permitted by clips 30 and 32, to bring hook 28 into engagement with arm 14. The parts then have the relative positions shown in dotted lines in FIG. 6. At this time, the grids 2 and 4 will have been more nearby closed to parallel relation, but not entirely, with meat products of normal density. The final closing motion of the grids may require substantial mechanical force.

Then, still using hook 36 as a handle, latch wire 24 is moved slidably forwardly relative to arm 22, as permitted by clips 30 and 32, with hook 28 moving slidably along arm 14, to the position shown in FIG. 7, with hook 28 closely adjacent the rearward edge of grid 4. During this movement, the hook 28, acting as a sort of sliding wedge, draws grid arms 14 and 22 gradually closer together, with a mechanical advantage substantially increasing the manual force exerted to move the latch wire forwardly, until the grids are finally disposed in parallel relation, as shown. The length of the arm 26 supporting hook 28 is such that when the parts are positioned as shown in FIG. 6, said grids must be substantially parallel, so that separate food items therebetween will be uniformly gripped therebetween, or so that a single loosely cohered food item such as a hamburger patty will be gripped over the maximum possible area thereof. Finally, the rearwardly extending end portion of latch wire 24 is flexed downwardly beside handle bar 16 and rear hook 36 is engaged with said handle bar as best shown in FIG. 5, thereby producing the relationship of the parts shown in FIG. 2. The food item or items are then fully mounted and gripped in the holder, and may be held and manipulated over a charcoal bed as may be required in the desired cooking thereof, with minimum danger that food items could fall from the holder by accident, and with handle bar 16 serving as a hand grip safely remote from the heat of the charcoal. The food items may be removed from the holder by reversing the above described insertion process.

It should be noted that virtually of necessity the drawings are of slightly diagrammatic nature, since virtually all elements of the device except handle bar 16 are formed of resilient wire and are at one time or another subject to bending stresses. For example, grids 2 and 4 are shown as substantially rigid in their own planes, and they actually are rigid, due to their configuration, as compared to their arms 22 and 14 respectively, but nevertheless they could bow slightly when food items are clamped therebetween. Also, arm 14 of the lower grid might be flexed at least slightly when arm 22 is moved to the dotted line position of FIG. 6. However, it is believed that the drawings are amply definitive to illustrate the operative principles involved.

While I have shown and described a specific embodiment of my invention, it will be readily apparent that many minor changes of structure and operation could be made without departing from the spirit of the invention.

What I claim as new and desire to protect by Letters Patent is:

1. A barbecue holder comprising:
   a. a pair of generally planar grids each including an open loop of wire, each having a forward and rearward edge, and adapted to be disposed in superposed relation in parallel, spaced apart planes when in a closed position,
   b. a link extending between and pivotally interconnecting the forward edges of said grids, whereby said grids may be pivotally spread apart to an open position to receive food items therebetween,
   c. a pair of handles extending rearwardly respectively from the rearward edges of said grids, normally substantially in the planes of said grids, whereby said grids may be manually opened for the insertion of food items, or closed to grip and compress said food items therebetween, said handle of the upper of said grids comprising a normally straight spring handle wire extending rearwardly from said upper grid, and
   d. latch means operable to secure said handles releasably together with said grids in their closed position, said latch means comprising a resilient latch wire lying alongside said handle wire, means joining said latch wire to said handle wire whereby the former may be moved longitudinally relative to the latter and an upwardly opening hook carried at the forward end of said latch wire and engageable slidably and detachably beneath the handle of said lower grid and spaced apart from said latch wire at such a distance that when so engaged with said lower handle closely adjacent said grids, it holds said grids in parallel planes, whereby when closing movement of said grids is arrested by food items therebetween, said latch wire may be moved rearwardly to position said hook well to the rear of said grids, said upper handle wire resiliently flexed to bring said hook into engagement with said lower handle, and said latch wire and hook moved forwardly, so that said hook wedges said handles closer together adjacent said grids to complete the closing movement of said grids.

2. A barbecue food holder as recited in claim 1 wherein said hook opens upwardly and lies in a plane transverse to said handles, and wherein said means joining said handle and latch wires is operable to permit turning of said latch wire substantially about its axis relative to said handle wire, and with the addition of manual means for turning said latch wire, whereby to facilitate engagement of said hook with said lower handle.

3. A barbecue food holder as recited in claim 1 wherein said latch wire projects rearwardly from the rearward end of said handle wire, and is provided at its rearward end with an upwardly opening hook formation adapted to engage upwardly oer said lower handle when said latch wire is flexed downwardly, whereby to secure and confine the rearward end of said latch wire.

4. A barbecue food holder as recited in claim 1 wherein said latch wire projects rearwardly from the rearward end of said handle wire, and is provided at its rearward end with a hook formation which opens upwardly whenever said latch wire is turned to engage the forward hook thereof with said lower handle, said rearward hook being adapted to engage upwardly on said lower handle when said latch wire is flexed downwardly, the configuration of said lower handle and said rear hook being such that said engagement secures said latch wire against axial turning, whereby accidental disengagement of said front hook from said lower handle is prevented.

* * * * *